June 28, 1960   C. EICKHOFF   2,943,196
INDICATOR
Filed March 11, 1954

INVENTOR
C. Eickhoff
ATTYS.

United States Patent Office 2,943,196
Patented June 28, 1960

2,943,196

INDICATOR

Carl Eickhoff, 4 Bergstrasse, Bottrop, Germany

Filed Mar. 11, 1954, Ser. No. 415,622

Claims priority, application Germany Mar. 13, 1953

5 Claims. (Cl. 250—43.5)

The present invention relates to an indicator, especially for measuring and indicating fluid or gaseous media which may contain solid substances distributed therein.

The electric measuring instruments as previously known for measuring fluid or gaseous media usually are adapted for only one specific purpose, so that a different measuring instrument will be required for each individual measurement.

The known electric measuring or indicating instruments usually constitute no more than mere flow velocity meters wherein the operating or effective pressure is recorded on an indicating instrument by means of an electric system which is controlled by a diaphragm or the like. Such apparatus, which are used, for example, for measuring temperature, pressure, and moisture content, such as Geiger meters, crystal meters, and the like, are not satisfactory as far as their design and construction is concerned, especially since they require moving parts.

It is therefore an object of the present invention to provide an indicator which can be used for a large variety of purposes and is distinguished by a high measuring accuracy as well as by the fact that it permits a far easier evaluation of the measure results.

An essential feature of the invention resides in providing a radioactive radiating element and a plurality of electrodes to which an electric potential is applied at the inside of a container holding the medium to be measured, or of a pipe through which such medium flows, so that the medium will be ionized by the radiating element and the movements of the ions and/or the electrons thus formed may be utilized for measuring and other purposes.

The indicator according to the invention, which may, for example, be a microammeter, either taken alone or in combination with one or more electric tubes, such as oscillator tubes, magnet amplifiers, or cold cathode rectifiers, permits various kinds of measurements to be carried out easily and, in some cases, even simultaneously. It also permits such measurements to be made not only for determining the characteristic values or changes in the condition of the respective media, but also for determining the analysis of such media, their decomposition, or the creation of new products, for example by the addition of new materials. The invention, used alone, is also adapted, for example, for carrying out direct measurements of flowing gases and liquids.

Additional features of the invention are based upon the fact that the apparatus may be constructed practically without any moving parts. It may therefore be used especially on vehicles, for example, airplanes, where it will always measure only the actually flowing medium regardless of its position or direction of movement, and will simultaneously also measure other values or properties of such medium.

Another feature of the invention for controlling a chemical process consists in carrying out the ionization of the gas or the like to be measured to the absorption frequency thereof, during which the flowing quantity will then be measured and controlled separately, while the deviation from the absorption frequency will be measured.

Another feature of the invention consists in applying sufficiently high potentials and utilizing the absorption frequency for analysing or decomposing the medium to be measured.

The indicator according to the invention may be applied either alone, that is, separately from the other procedures taken according to the invention, or in any combination with such procedures, for example, for forming hydrocarbon compounds, in which event it is used in such a manner that after the gaseous hydrocarbon has been purified, it will be ionized by several radiating indicators which are arranged in a steplike formation one behind the other, and then, by decomposing the steam into hydrogen and oxygen in a further radiating indicator, it forms directly with the hydrogen a hydrocarbon compound from which the oxygen may be drawn off as a chemically pure product.

Further objects, features, and advantages of the invention, as well as further applications, combinations, and examples thereof will appear from the following detailed description and the accompanying drawings, in which—

Figure 1:
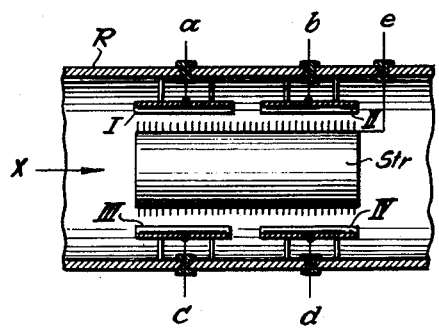
Fig. 1 shows a longitudinal section of a pipe through which the medium flows which is to be measured, and containing the radiating element and the electrodes according to the invention.
Figure 2:
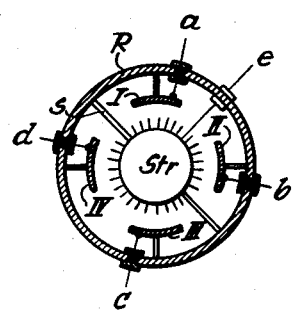
Fig. 2 shows a cross section through the pipe as shown in Fig. 1.

As illustrated in Figs. 1 and 2, the gaseous or liquid medium either flows, for example, in the direction of the arrow $x$, through a pipe $R$, or it is contained in a condition of rest in a suitable container of similar construction.

A radiating element $Str$, which is used for ionizing the medium, is mounted preferably in the central part of the pipe or container $R$, which may then consist of insulating material, such as a ceramic material, glass, or the like, or they may be mounted at a certain distance from the wall and be insulated therefrom, in which case the electrodes together with the metallic wall of the pipe or container $R$ may form a condenser.

If in place of the pipe $R$ a potlike container is used to hold the medium to be examined, analyses may then be carried out or changes in pressure may be determined.

If the radiating element $Str$ is mounted in a pipe and the medium is in a condition of rest, it is likewise possible first to make an analysis of the medium. Temperature changes may then also be measured.

If the medium starts flowing, the velocity of such flow and/or the viscosity of the medium may then be measured, and at the same time the temperature, the pressure, and the analysis may be checked. Thus, it is possible, for example, to measure the quantity of a gas flowing through the pipe directly in standard cubic meters, and also to introduce the barometer reading into the measuring formula if a second similar arrangement should be available.

Figure 3:
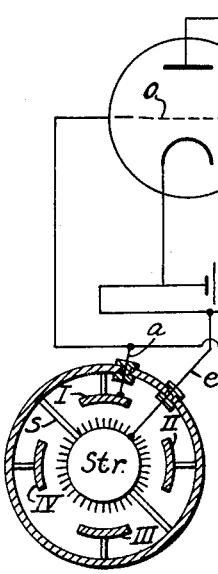
Fig. 3 shows a circuit diagram of an oscillator tube used with the flow pipe according to Fig. 2.

It is also possible to provide an arrangement in which two or more electrodes I, II, etc form part of an oscillatory circuit of an electric tube, particularly an oscillator tube connected as shown in Fig. 3. If the frequency of oscillation is changed, such change may likewise be measured. If a high measuring accuracy is to be obtained, the changing frequency may be utilized by means of a rectifier to control the grid of a further tube or a magnet amplifier.

At small velocities of flow, the pipe R, as shown in Fig. 1, may be designed as a venturi tube for generating an operating or effective pressure. However, such pressure may also be produced in any other manner.

Since, when using apparatus of a known design, the flow curve of a flow produced by a uniform design of the apparatus is often not sufficient for measuring and, especially, for controlling purposes, the electrodes I to IV according to Fig. 1 may be made of various shapes. For this purpose, the electrodes may be made, for example, of different length. When the medium flows, the carriers produced by the ionization are taken along entirely or partly in the direction of flow, so that on one electrode the electric current decreases, while on the other it increases.

Depending upon the distance of the electrodes from each other or from the radiating element S$tr$, as well as depending upon their length, different electric current curves may be obtained. For a simple quantity or flow measurement, a current curve may be obtained which represents the values of $\sqrt{h}$, wherein $h$ equals the usual differential pressure.

If several electrodes are connected to several, for example, two, electric circuits, the value $\sqrt{h}$ when multiplied with the value $\sqrt{P}$, the static pressure, may produce standard cubic meters if the constant is included, the temperature and the barometer reading then not being considered.

By providing several electrodes as previously described, it is possible, together with the analysis, the temperature, and the pressure, not only to plot the standard cubic meter curve but also to determine, for example, the viscosity of the medium.

The individual multiplications for obtaining the final product as well as other calculations may be carried out in various ways. Thus, by varying the distance of the electrodes I, II, III, and IV from the radiating element S$tr$, and the distance of the electrodes relative to each other, as well as their respective lengths, multiplications or divisions of individual current values may be obtained by plotting logarithmic electric current curves, so that the electrical values only need to be added or subtracted. The individual circuits may also be designed so as to form a voltage divider or a "calculating" bridge. In such event, the electrodes I to IV may be supplied with the usual direct current, a pulsating current, or an alternating current.

If only a radiating element with a very small output is to be used, a relatively small gap should be provided between such element and the electrodes.

For measuring gases which might cause incrustation or soiling of the apparatus, and providing that the voltage applied to the electrodes is insufficient for the depolarization, a special depolarization voltage may be impressed upon the electrodes. If the electrodes I to IV are arranged at a certain distance from the pipe wall, it is also possible in place of such depolarization voltage to combine the electrodes or the pipe wall into a separate depolarization system.

Depending upon the type of the medium to be measured, the same purpose may also be obtained by using more vigorous rays and a special electrode material. Thus, beta or gamma rays may be applied which, because of their deeper penetrating effect as compared with the alpha rays which produce the highest ionization, are able to free secondary electrons which, in turn, may produce the depolarization within a weak field.

If the apparatus is to be used for controlling a chemical process, for example, for fully automatically mixing two gases, a very high measuring accuracy of the apparatus will be required, since the controlling effect produced thereby must be electrically amplified, and since at a lower measuring accuracy the error would be multiplied many times. For this purpose, according to the invention, the gas to be measured will be ionized to its absorption frequency. Since it depends essentially upon the formation of the carrier, i.e. upon the volume of the flow, whether the desired frequency be reached, such flow volume will be measured and controlled separately, and the deviation from the absorption frequency will be measured.

Such measurements using the absorption frequency may also be carried out by means of the circuit system illustrated in Fig. 3. The measurement could, for example, be carried out as an attenuation measurement in decibels, which, in turn, can be re-evaluated in any manner known in the electronics art.

Depending up its properties, the medium to be measured may also be either heated or cooled for obtaining the desired purpose.

When using a suitable mechanism, the medium to be measured may also be decomposed in the absorption frequency. Thus, when using a sufficiently high voltage, $NH_3$ may be decomposed at a frequency of approximately $2.3 \times 10^{10}$ cycles per second into N and H, and the individual gases may then be drawn off, or one or the other gas may be mixed with a new gas in an ionized condition, resulting from passing it through a further apparatus according to the invention, so that, after passing through such apparatus, and while maintaining the absorption frequency of the chemical composition newly to be obtained, a new chemical end product will be obtained.

Since the carbon so far exists in the form of a gas only in an ionized condition, it may be first purified by the apparatus according to the invention by connecting several such apparatus in a steplike formation one behind the other, then it may be ionized, and then, by decomposing the steam into hydrogen and oxygen, it may be converted by means of the hydrogen into a hydrocarbon, while the oxygen may be drawn off as a chemically pure product.

Since the apparatus does not require any moving parts, it may also be used, for example, as a gasoline flow meter for vehicles, including airplanes, since in any position and in any direction of movement it will always measure only the amount actually flowing through.

If standard values of a standard gasoline are to be considered, it is possible also simultaneously to determine the water content thereof. When measuring an oil flow, a changed composition and viscosity may also be determined at the same time.

When measuring atmospheric air, the apparatus may be used for determining the radioactivity of the air. For this purpose, the output of the radiating element will be made so small that, for obtaining a high sensitivity, it will just equal the sum of the radioactivity of the earth and the cosmic radiation, i.e. approximately $10^{-9}$ r./s.

In combination with the circuit shown in Fig. 3, the measurement of the air temperature, the air pressure, and the moisture content of the air may be corrected, if the temperature is standardized at a certain value in temperature degrees in Torr, e.g. C. °, and at a moisture content of the air equalling zero. An extremely high measuring accuracy is thus obtained.

The indicator according to the invention may also be connected to electric tubes or magnet amplifiers, and such a combination may again be used to carry out calculating operations. For this purpose, the direct current control coils together with the electrodes may form a bridge circuit or the like. In place of an oscillator tube, a magnet amplifier may then be used which acts as a high frequency amplifier, the frequency of which is produced, for example, by the radioactive radiating element S$tr$ or by another high frequency generator, for example, a transistor, since the operating frequency of the magnet amplifier should, if possible, be always higher than the frequency to be used.

For control purposes, the terminal $h$ according to Fig. 3 may be connected with the grid of a measuring tube following thereafter, if desired, through a rectifier. In order to render changes of the oscillator frequency more visible, it may first be transmitted to an intermediate frequency stage.

According to the preceding description, the terminals $c$ and $a$ or $a$ and $d$, as shown in Figs. 1 and 2, or another suitable terminal may be connected to a second tube, the grid of which will be specially controlled by the connection $h$. If the flowing gas or the like is controlled in the absorption frequency, the oscillator frequency measures as desired, for example, the pressure or temperature changes, while the second tube stage carries out the analysis in the absorption frequency, which is corrected by the terminal $h$ through the grid control.

Figure 4:
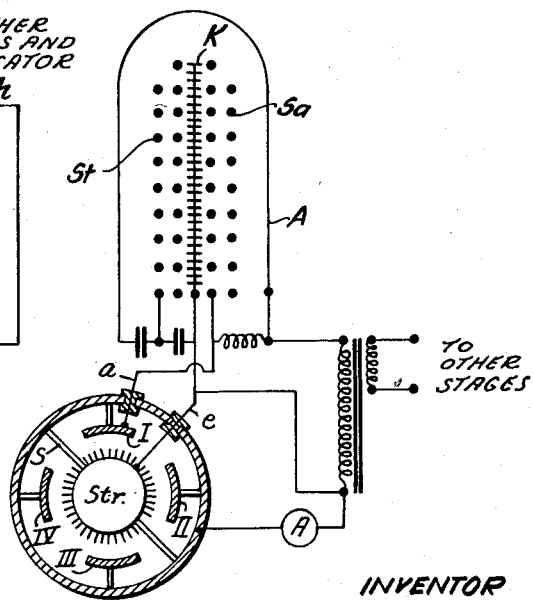
Fig. 4 shows a cold cathode rectifier used with the flow pipe of Fig. 2.

If the apparatus is used for decomposing and newly building up chemical compositions, in place of the tubes special highly efficient high frequency generators may be included, for example, as shown in Fig. 4. Such high frequency generators in principle constitute a cold cathode rectifier with the anode A and the built-in suction grid $Sa$ and the control grid $St$, whereby the desired frequencies can be filtered out for example, by means of quartz crystals or another filter, in which case the cathode K may at the same time form the radiating element as such. Here the elements of Figs. 1 and 2 are shown connected between the oscillator grid and the cathode in conventional manner. An ammeter A may be connected in the circuit, as illustrated, for measurements.

Since such cold cathode rectifiers operate efficiently only when arranged in several stages, several of them may preferably be provided for the purposes of the invention and be connected in series. In order to produce a new final product from several raw materials, several such apparatus may first be connected in parallel, and the ionized gases may then be supplied to an apparatus for producing the final product. Such systems not only replace catalysts but also result in a much higher performance.

While the foregoing description sets forth in detail some of the preferred embodiments of my invention, it is to be understood that my invention is in no way limited to the details of such embodiments or to the specific examples described but is capable of numerous modifications within the scope of the appended claims. Thus, for example, the invention also permits the application of high frequency generators, amplifiers, filters, etc. of other types than those described, as well as modifications in the design and construction of the apparatus.

Having thus described the invention, what I claim as new is:

1. In a system for measuring and changing the properties of fluids the combination comprising a casing to contain the fluid, a radio-active radiating element disposed in said casing, a first electrode and a second electrode in said casing, means to apply a potential difference between the said first and second electrode to create an electron flow therebetween, and means to vary the potential difference to alter the frequency of oscillation of the electrons, said oscillations being the result of combining the radio-active radiation and the electrons.

2. In a system for measuring and changing the properties of fluids the combination comprising a casing to contain the fluid, a radio-active radiating element disposed in said casing, a first electrode and a second electrode in said casing, means to apply a potential differencee between the said first and second electrodes to create an electron flow therebetween, means for holding constant the difference of the potentials applied to the respective electrodes, and means for indicating variations of the potential difference created by the fluid.

3. The invention as set forth in claim 2 wherein said last named means comprises an electrical oscillating circuit, said electrodes connected as a parameter thereof to vary the frequency of oscillation.

4. In a system for measuring the properties of a fluid the combination comprising a casing to contain the fluid, a radio-active radiating element disposed in said casing, a first and a second electrode in said casing, means to apply a potential difference between said electrodes to create an electron flow, and means to vary the potential difference, said last named means adapted to bring the electron oscillation frequency into resonance with the absorption frequency of the fluid.

5. In a system for the determination of air conditions the combination comprising a casing to receive air, a radio-active element disposed in said casing, a plurality of electrodes in said casing, means to apply a high frequency alternating potential to said electrodes, said electrodes forming a part of an oscillator tube circuit and means calibrated in temperature degrees to indicate ambient conditions.

References Cited in the file of this patent

UNITED STATES PATENTS

| | | |
|---|---|---|
| 1,808,709 | Blake | June 2, 1931 |
| 2,386,831 | Wright | Oct. 16, 1945 |
| 2,487,797 | Friedman et al. | Nov. 15, 1949 |
| 2,740,894 | Deisler et al. | Apr. 3, 1956 |
| 2,755,388 | Weisz | July 17, 1956 |